(12) United States Patent
Kobayashi

(10) Patent No.: US 6,823,198 B2
(45) Date of Patent: Nov. 23, 2004

(54) PORTABLE PHONE WITH CAMERA

(75) Inventor: Kiyotaka Kobayashi, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 615 days.

(21) Appl. No.: 09/851,078

(22) Filed: May 9, 2001

(65) Prior Publication Data
US 2001/0053703 A1 Dec. 20, 2001

(30) Foreign Application Priority Data

May 11, 2000 (JP) ........................................ 2000-138367

(51) Int. Cl.$^7$ ................................................ H04B 1/38
(52) U.S. Cl. .................... 455/556.1; 455/557; 455/300; 348/224.1; 348/375
(58) Field of Search .............................. 455/556.1, 557, 455/300, 301; 348/224.1, 333.01, 375, 370, 362, 371; 396/542

(56) References Cited

U.S. PATENT DOCUMENTS

| 4,963,987 | A | * | 10/1990 | Ichiyoshi et al. | ........... 348/375 |
| 5,258,800 | A | * | 11/1993 | Seki et al. | ................... 396/542 |
| 5,265,273 | A | * | 11/1993 | Goodwin et al. | ........... 455/301 |
| 5,471,242 | A | * | 11/1995 | Kondo | ....................... 348/362 |
| 5,729,291 | A | * | 3/1998 | Tanaka et al. | ......... 348/333.01 |
| 5,893,037 | A | * | 4/1999 | Reele et al. | ............. 455/556.1 |
| 6,160,967 | A | * | 12/2000 | Mizobuchi | .................. 396/542 |
| 6,311,023 | B1 | * | 10/2001 | Watanabe | .................... 396/542 |
| 6,356,717 | B2 | * | 3/2002 | Tanaka et al. | .............. 396/542 |
| 6,683,644 | B1 | * | 1/2004 | Nakao et al. | .......... 348/333.01 |

FOREIGN PATENT DOCUMENTS

JP          10-336498       12/1998

* cited by examiner

Primary Examiner—Edward F. Urban
Assistant Examiner—Lana Le
(74) Attorney, Agent, or Firm—Young & Thompson

(57) ABSTRACT

An electronic flash is provided for a body of a portable phone with a camera, and the electronic flash emits light by a release operation of a shutter release button, thereby photographing a subject by illuminating with a light. A backlight of a liquid crystal display and an electronic flash discharge tube of the electronic flash which correspond with a noise source are contained in containers which are formed on the surface of an electromagnetic shield frame, and an electronic circuit board of the portable phone with a camera is mounted on the back side of the electromagnetic shield frame, so that a shield unit is constructed. Therefore, radio waves generated from the electronic flash and the liquid crystal display are attenuated before reaching the electronic circuit board, and misoperations of the portable phone due to the radio waves can be prevented.

4 Claims, 4 Drawing Sheets

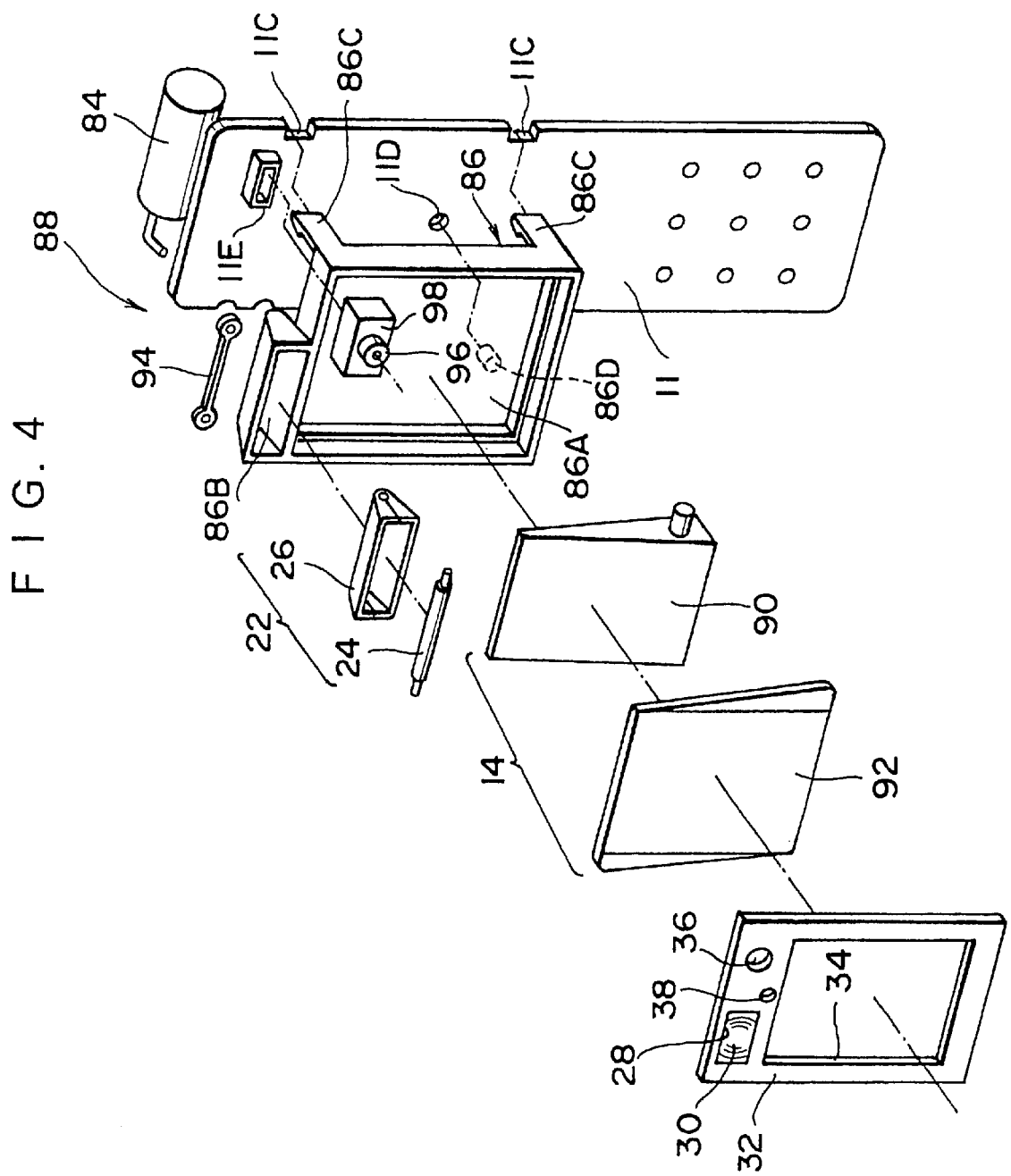

PORTABLE PHONE WITH CAMERA

BACKGROUND OF THE INVENTION

1. Field of the invention

The present invention relates to a portable phone with a camera, specifically to a portable phone with an electronic camera which has a solid-state imaging device.

2. Description of the related art

A portable phone with an electronic camera is disclosed in Japanese Patent Application Laid-open No.10-336498. A body of the phone has a taking lens and a viewfinder, and a cover connected to the body has a liquid crystal display. When the cover is closed, the user can use the camera looking into the viewfinder; and when the cover is open, the user can use the camera looking at the liquid crystal display. To make a phone call, the user opens the cover and dials a phone number using a touch panel or numeric keys on the cover. To transmit image data on the phone, the user chooses transmission with a function key or the like and selects a desired image, and then dials a phone number.

However, the camera does not have the capacity to capture an image well in poor-lighted conditions.

SUMMARY OF THE INVENTION

The present invention has been developed in view of the above-described circumstances, and has as its object the provision of a portable phone with a camera which can capture an image well even in poor-lighted conditions.

In order to achieve the above-described object, the present invention is directed to a portable phone with a camera, comprising: an imaging device and a shutter releasing device that capture an image through a taking lens when the shutter releasing device releases a shutter; and an electronic flash that emits a light when the shutter releasing device releases the shutter.

According to the invention, the electronic flash is provided to the portable phone with the camera, and the electronic flash emits the light when the shutter releasing device releases the shutter. Thus, the camera can capture the image well even in poor-lighted conditions.

In the invention, the portable phone with a camera further comprises a display device that displays the image captured when the shutter releasing device releases the shutter, and the display device and a light-emitting part of the electronic flash are separate from an electronic circuit board with an electromagnetic shield between them. Since the radio waves generated from the electronic flash and the display device do not reach the electronic circuit board, misoperations of the portable phone due to the radio waves can be prevented.

In the invention, the display device and the light-emitting part of the electronic flash are contained in containers formed on one side of the electromagnetic shield, and the electronic circuit board is mounted on the other side of the electromagnetic shield. Thus, the light-emitting part of the electronic flash and the display device can be easily separated from the electronic circuit board.

In the invention, a charging of the electronic flash is prohibited while a user is talking on the portable phone. Thus, low-frequency switching noise generated from the charging can be prevented from interfering with audio signals.

In order to achieve the above-described object, the present invention is also directed to a portable phone with a camera, comprising: an electronic flash that emits light; an electronic circuit board; and an electromagnetic shield that separates the electronic flash and the electronic circuit board.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a perspective view of an assembly of the shield unit in FIG. 3.

DETAILED DESCRIPTION OF THE PREFERRED EMBODIMENTS

Hereunder a preferred embodiment will be described in detail for a portable phone with a camera of the present invention in accordance with the accompanying drawings.

Figure 1:
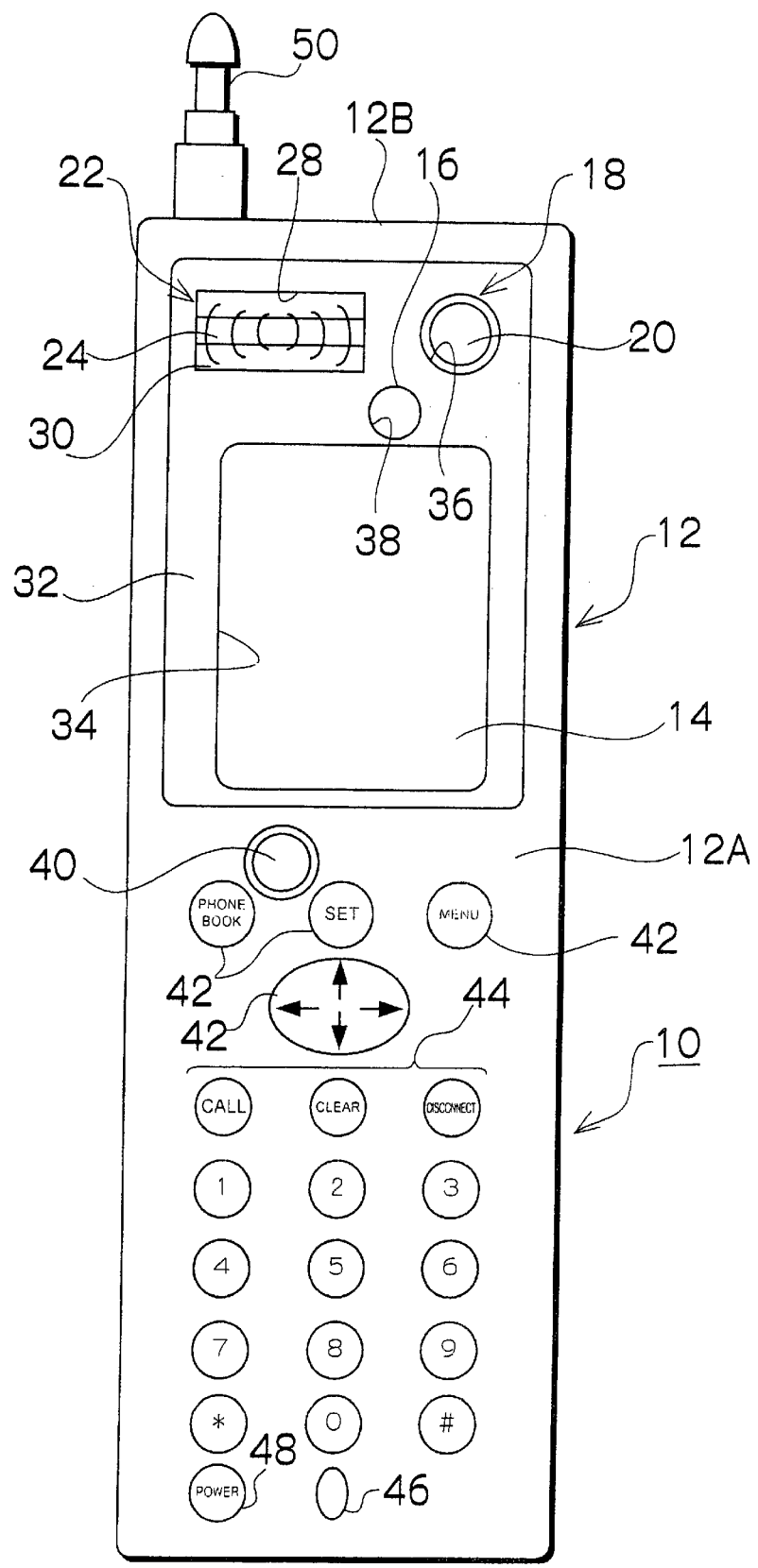
FIG. 1 is a front view of a portable phone with a camera to which the present invention is applied.

In a portable phone 10 attached with a camera in the embodiment in FIG. 1, a body 12 of the portable phone 10, an outer case, is formed like a longitudinal box. At the upper part of a front 12A of the portable phone, a rectangular liquid crystal display (equivalent to a display device) 14 is arranged for displaying communication data and images. A receiver 16 is arranged above the liquid crystal display 14. A taking lens 20 and an electronic flash 22 are arranged above the receiver 16. By this arrangement, an unnatural shadow is prevented from appearing on a subject which is photographed by emitting a light. A position for arranging the electronic flash 22 is not restricted to a side of the taking lens 20, but may be over the taking lens 20.

The electronic flash 22 comprises an electronic flash discharge tube 24 and a reflective cover 26 (see FIG. 4), and a protector 30 is attached to an opening 28 which is formed in the front of the electronic flash discharge tube 24 in FIG. 1. The opening 28 is formed on a cover panel 32 which is fixed at the front face 12A of the body 12 of the portable phone 10. In addition to the opening 28, a rectangular opening 34 for exposing the liquid crystal display 14, a circular opening 36 for exposing the taking lens 20, and an opening 38 for the transmitter 16, are formed at the cover panel 32.

A solid-state imaging device (CCD) (not shown) is arranged behind the taking lens 20, and an image of the subject which is imaged by the CCD is displayed on the liquid crystal display 14. A shutter release button (corresponding with a release device) 40 is arranged below the liquid crystal display 14, on which not only a still image but also an image before a release operation (a moving image or an intermittent image) can be displayed in response to a pressing operation (corresponding with the release operation) of the shutter release button 40.

Below the shutter release button 40, various buttons 42 for designating and selecting a telephone number, characters and an image, numeric keys 44 for directly inputting a telephone number, etc. are arranged. A transmitter 46 is arranged below the numeric keys 44, and a power switch 48 for turning on and off the portable phone 10 is arranged on the left side of the transmitter 46. An antenna 50 for wireless communication with a public line is provided on a top 12B of the body 12 of the portable phone 12.

Figure 2:
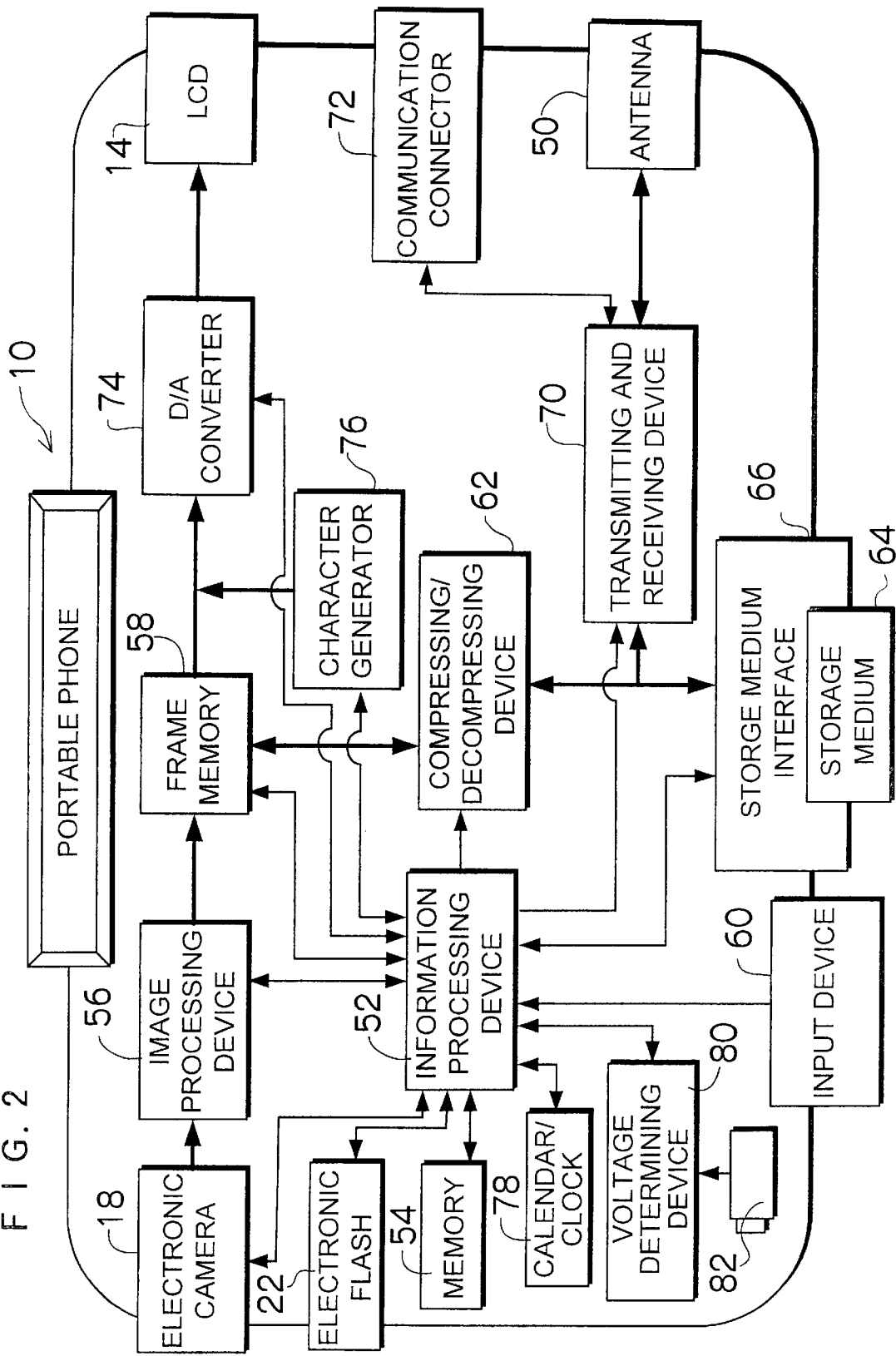
FIG. 2 is a block diagram showing a structure of a system of a telephone in FIG. 1.

FIG. 2 is a block diagram showing a signal processing system of the portable phone 10 attached with a camera.

The portable phone 10 attached with a camera is provided with the electronic camera 18 for forming the subject image is a receiving surface and for photoelectrically converting the image, then for outputting as image data, and the electronic flash 22 for emitting a light and supplementing light for the subject. The electronic camera 18 includes a focus adjustment device for focusing the subject image on the receiving surface, an iris adjustment part for adjusting exposure, a shutter speed adjustment device for adjusting an exposure time, and a zoom adjustment device for adjusting a viewing angle.

Device and a circuit part which will be listed below are mounted on an electronic circuit board 11 (see FIGS. 3 and 4) of the portable phone 10 attached with a camera. An information processing device 52 (see FIG. 2) is mounted for controlling the entire portable phone 10 attached with a camera. The information processing device 52 controls a sampling timing of the image data, the electronic flash 22, exposure including iris and shutter speed, focusing, zooming, setting white balance, recording of image data, communication, display, image pixel number converting process of the image data, respective converting of image data, setting and canceling of a power-save mode, and so forth. A memory 54 is connected with the information processing device 52. The memory 54 is constructed by an activation program and respective fixed number of the portable phone 10 attached with a camera and a parameter showing a photographing condition, an ROM in which a parameter and the like are stored which indicates characteristics of an image, and an RAM which is a memory device as an operating area while the program is executed.

The portable phone 10 attached with a camera is further provided with an image processing device 56 which processes changing number of pixels, sharpness correction, gamma correction, contrast correction, and white balance correction and so forth, an input device 60 (see FIG. 2) which includes a frame memory 58 for temporarily storing the image data, the shutter release button 40, and various buttons 42 (see FIG. 1) and so forth, a compressing and decompressing device 62 which compresses the data such as image data in a format such as the JPEG and the MPEG and decompresses the compressed data in accordance with instructions of the information processing device 52, and a storage medium interface 66 which converts the data in order to record the image data in a removable storage medium 64 as well as read out the image data from the storage medium 64. The storage medium 64 is a memory card, an MO or the like that uses a semiconductor, magnetic recording or optical recording.

When exchanging image data with other instruments, a wireless communication device of the portable phone with a camera comprises a transmitting and receiving device 70 which transmits and receives data such as image data and directories in accordance with instructions from the information processing device 52, the antenna 50 which exchanges the transporting wave and data, and a communication connector 72 which performs a wired communication by connecting other instruments via cables for exchanging image data and so forth. Through the communication device comprising the above-described device, the portable phone 10 attached with a camera can transmit the data stored in an image file, RAM, ROM, and the frame memory 58 to other communication instruments and can receive and store the data from other communication instruments into the respective types of storage device.

When exchanging the data with other communication instruments via the connector 72, the communication instruments which exchange data with each other are connected via a cable, so that the data is communicated by converting the data into an electric signal or an optical signal.

The portable phone 10 attached with a camera is further provided with a D/A converter 74 (see FIG. 2) which displays the image data on the liquid crystal display 14 (see FIG. 1), a character generator 76 which converts code data instructed from the information processing device 52 into data of characters and messages to be displayed, and a calendar/clock 78 to indicate data and time.

The portable phone 10 attached with a camera is also provided with a voltage determining device 80 which determines the voltage of a power source 82. When the voltage is below a predetermined voltage, more specifically, the voltage with which electricity for the portable phone 10 is lost at a time a main condenser 84 (see FIG. 4) of the electronic flash 22 is charged, the information processing device 52 (see FIG. 2) so controls the electronic flash 22 as to inhibit charging to the main condenser 84. The information processing device 52 also controls the electronic flash 22 to inhibit the charging to the main condenser 84 while using the portable phone 10. Thereby, low-frequency switching noise generated from the charging does not interfere with the audio signals.

Figure 3:
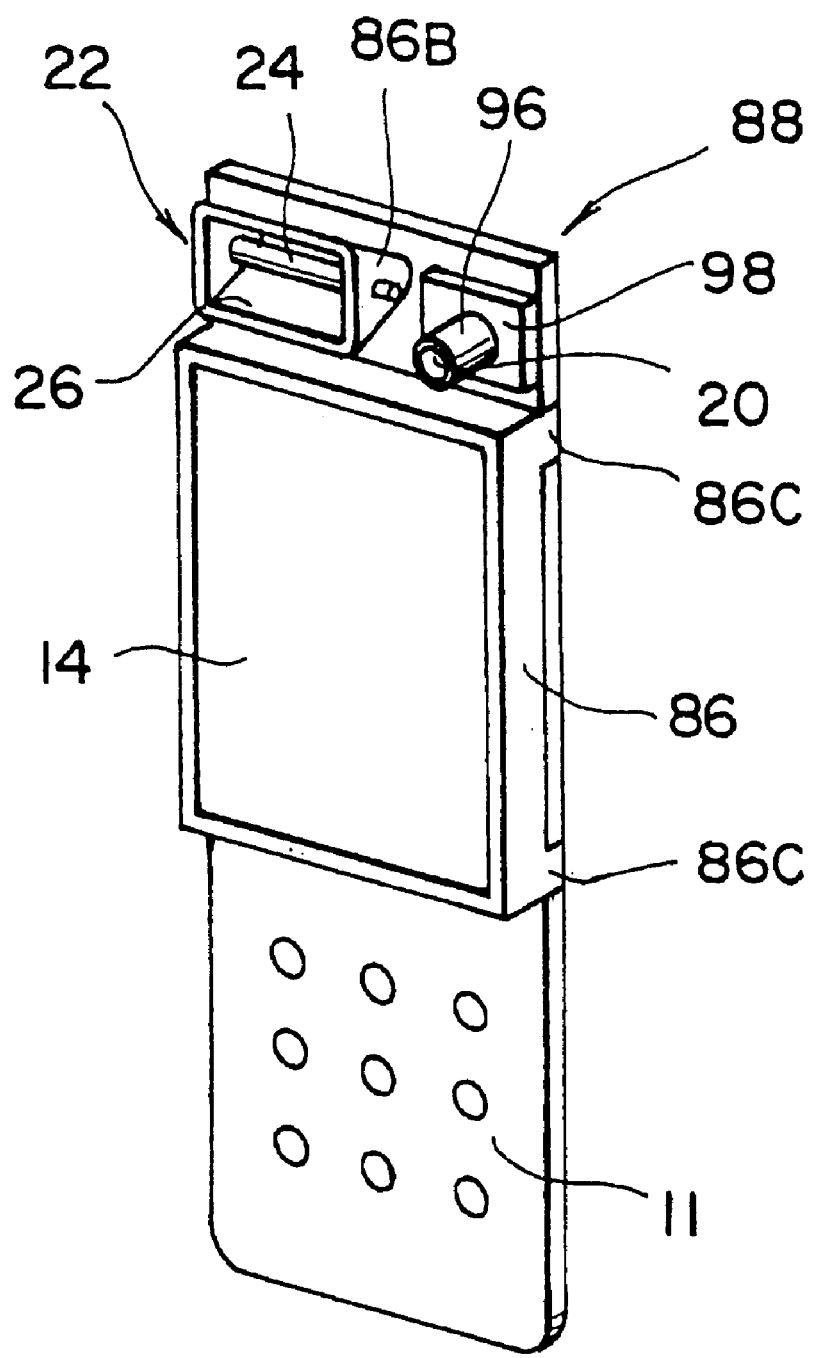
FIG. 3 is a perspective view of a shield unit which is constructed by attaching an electronic flash, a liquid crystal display, and an electronic circuit board to an electromagnetic shield.

FIG. 3 is a perspective view of a shield unit 88 composed of the liquid crystal display 14, the electronic flash 22, the electronic circuit board 11 and an electromagnetic shield frame 86 made of copper or steel.

As seen from FIG. 4, a rectangular container 86A for containing the liquid crystal display 14 is formed on the front side of the electromagnetic shield frame 86. A backlight 90 and a liquid crystal panel 92 of the liquid crystal display 14, which is a noise source, is contained in the container 86A. A container 86B in a rectangular shape for containing the electronic flash 22 is integrally formed on the top of the container 86A, and the reflective cover 26 to which the electronic flash discharge tube 24 is attached is contained in the container 86B. The reference number 94 is assigned as a stopper ring for the electronic flash discharge tube 24.

Four projections 86C are formed at the corners of the back side of the electromagnetic shield frame 86 (the two projections 86C on the left edge are not shown in FIG. 4). The projections 86C are engaged with cuts 11C formed at the edges of the electronic circuit board 11, whereby the electronic circuit board 11 is mounted on the back side of the electromagnetic shield frame 86. A positioning pin 86D is projected on the back side of the electromagnetic shield frame 86, and the positioning pin 86D is fitted into a positioning hole 11D of the electronic circuit board 11, whereby relative positions of the electronic circuit board 11 and the electromagnetic shield frame 86 are determined. A fixing part 11E at which a CCD substrate 98 connected with a taking lens barrel 96 is formed over the electronic circuit board 11.

Now, an operation of using the portable phone 10 attached with a camera will be described. Since an electronic flash 22 is provided to the body 12 of the portable phone 10, the electronic flash 22 automatically emits light in response to the release operation of the shutter release button 40 so as to illuminate and photograph the subject in a case where the subject is photographed in poor-lighted conditions. Therefore, the subject can be well photographed even in poor-lighted conditions.

In the portable phone 10 attached with a camera, the backlight 90 and the panel 92 of the liquid crystal display 14 that is a noise source as shown in FIG. 4, and the electronic flash discharge tube 24 of the electronic flash 22 are contained in the containers 86A and 86B which are formed on the surface of the electromagnetic shield frame 86, and the electronic circuit board 11 of the portable phone 10 attached with a camera is mounted on the back side of the electromagnetic shield frame 86 so as to construct the shield unit 88. By this structure, the radio waves generated by the electronic flash 22 and the liquid crystal display 14 are dramatically attenuated by the electromagnetic shield frame 86 before reaching the electronic circuit board 11. Therefore, the misoperations of the portable phone 10 due to the radio waves can be prevented.

In order to cope with an EMI, a shield unit 88 is preferably constructed by using the electromagnetic shield frame 86 so as to decrease noise.

Moreover, the present embodiment exemplified the portable phone 10 attached with a camera in which the electronic camera 18 is built in the body of the portable phone 10; however, a portable phone with a camera may be one in which an electronic camera is attached outside the body 12 of the portable phone 10.

As described above, in the portable phone with a camera of the present invention, the electronic flash is provided to the body of the portable phone with a camera, and the subject is illuminated by the light and photographed by emitting the electronic flash with the release operation of the release device. Therefore, the subject can be perfectly photographed in poor-lighted conditions.

In the present invention, the electronic flash and the display device corresponding with a noise source are separated from the electronic circuit board of the portable phone with a camera through the electromagnetic shield; therefore, misoperations of the portable phone due to the radio waves can be prevented.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A portable phone with a camera comprising:

an imaging device and a shutter releasing device that capture an image through a taking lens when the shutter releasing device releases a shutter;

an electronic flash that emits a light when the shutter releasing device releases the shutter; and a display device that displays the image captured when the shutter releasing device releases the shutter, wherein the display device and a light-emitting part of the electronic flash are separate from an electronic circuit board with an electromagnetic shield between them.

2. The portable phone with the camera as defined in claim 1, wherein:

the display device and the light-emitting part of the electronic flash are contained in containers formed on one side of the electromagnetic shield; and the electronic circuit board is mounted on the other side of the electromagnetic shield.

3. A portable phone with a camera comprising:

an imaging device and a shutter releasing device that capture an image through a taking lens when the shutter releasing device releases a shutter;

an electronic flash that emits a light when the shutter releasing device releases the shutter; and a control part that prohibits a charging of the electronic flash while a user is talking on the portable phone.

4. A portable phone with a camera, comprising:

an electronic flash that emits light;

an electronic circuit board; and an electromagnetic shield that separates the electronic flash and the electronic circuit board.

* * * * *